No. 655,879. Patented Aug. 14, 1900.
G. W. LISK.
HOSE TIP.
(Application filed Mar. 7, 1900.)
(No Model.)
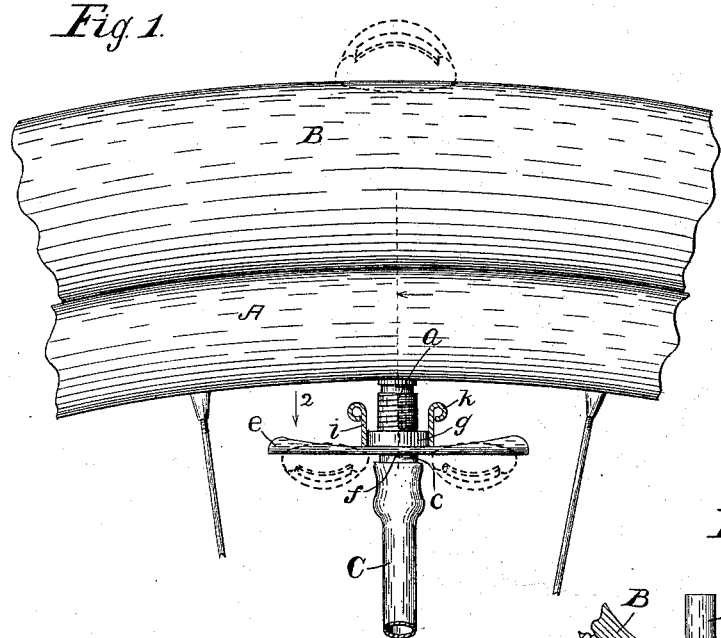
Fig. 1.
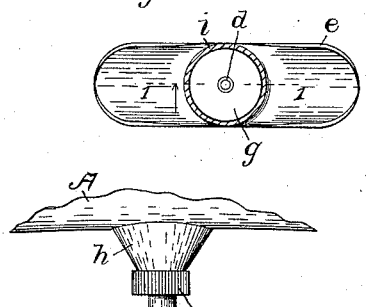
Fig. 2.
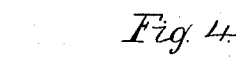
Fig. 4.
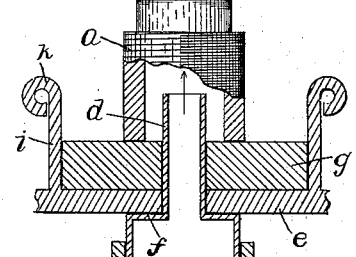
Fig. 5.
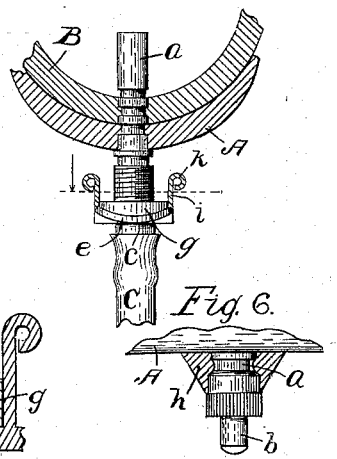
Fig. 3.
Fig. 6.
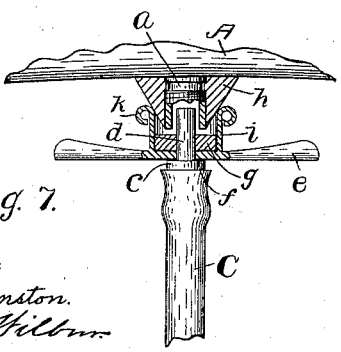
Fig. 7.
Fig. 8.
Attest:
M. L. Winston.
H. W. Wilbur.
Inventor:
G. W. Lisk,
By E. B. Whitmore, Atty.
THE NORRIS PETERS CO., PHOTO-LITHO., WASHINGTON, D. C.

UNITED STATES PATENT OFFICE.

GEORGE W. LISK, OF CLIFTON SPRINGS, NEW YORK.

HOSE-TIP.

SPECIFICATION forming part of Letters Patent No. 655,879, dated August 14, 1900.

Application filed March 7, 1900. Serial No. 7,692. (No model.)

*To all whom it may concern:*

Be it known that I, GEORGE W. LISK, of Clifton Springs, in the county of Ontario and State of New York, have invented a new and useful Improvement in Hose-Tips, which improvement is fully set forth in the following specification and shown in the accompanying drawings.

My invention is an end piece or tip for hose designed more particularly to be used with small hose or india-rubber tubes—as, for example, such as used for inflating the india-rubber tires of the wheels of bicycles or motor-wagons.

The main object of the invention is to provide a tip or end piece for the hose by means of which the connection with the tire may be made quickly and by a mere contact or pressing together of the parts without the turning or fitting together of threaded or other interlocking parts.

The invention is hereinafter fully described, and more particularly pointed out in the claims, reference being had to the accompanying drawings, forming a part of this specification.

Figure 1 is a side elevation of a part of a wheel with india-rubber tire, showing my invention applied, a minor part being longitudinally sectioned, as on the dotted line 1 1 in Fig. 2. Fig. 2 is a plan of the finger-rest and cushion, seen as indicated by arrow 2 in Fig. 1, a part being horizontally sectioned, as on the dotted line in Fig. 3. Fig. 3 is a transverse section of parts of the wheel and of the hose-tip, taken as on the dotted line in Fig. 1. Fig. 4, drawn to a larger scale, shows more fully the construction and relation of the parts, the section shown being as on the dotted line in Fig. 2. Fig. 5 is a side elevation of a part of the felly of the wheel, showing a rubber cone on the inflation-tube. Fig. 6 is a central longitudinal section of the cone in place upon the tube. Fig. 7 is a side elevation of connected parts, the cone and other parts being sectioned, as on the dotted line in Fig. 2. Fig. 8 shows in side elevation the tip, cone, and other associated parts when connected.

A is the felly of the wheel, and B the rubber tire therefor.

$a$ is the ordinary inflating tube or nipple, rigid with the wheel, $b$, Figs. 5 and 6, being a screw-cap therefor.

C is a flexible tube or hose, as of india-rubber, leading from an air-pump or other source of air-supply.

$c$ is a tubular terminal for the hose C, as of metal, permanently connected therewith, formed with a reduced part or extreme end $d$ to enter the tube $a$ for inflating the tire. A finger-rest $e$ is placed transversely upon the part $d$ of the terminal $c$, rigid therewith and resting against the shoulder $f$ at the base of the part $d$. This finger-rest is formed with a circular flange or cup $i$, having a rolled edge $k$, in which is placed a yielding disk or cushion $g$, Figs. 1, 3, 4, and 7, as of india-rubber, as shown, which cushion when pressed against the end of the tube $a$ forms an air-tight joint therewith, or if the wheel have a soft-rubber cone $h$ upon the tube $a$, as is frequently the case, the edge of the flange or cup $i$ is pressed against the rubber cone, as shown in Figs. 7 and 8, to make the air-tight joint.

In using this device for inflating tires it is simply pressed against the inflating-tube $a$ or the cone $h$, as the case may be, by means of the thumb and fingers of the left hand, as indicated in Fig. 1. No time is taken or lost in making connections with the tube $a$ for the purpose of inflating the tire, as no threaded parts or other similar coupling devices or connections need be shifted or adjusted, it being only necessary to remove the screw-cap $b$ from the tube $a$ when it is wished to inflate the tire.

What I claim as my invention is—

1. A hose tip or coupling comprising a tubular part secured to the end of the hose, and a laterally-projecting finger-rest carried by said tubular part, and a cushion on the tubular part adjacent to the finger-rest, substantially as shown and described.

2. A tip or terminal for hose, comprising a tubular part carried by the hose, and a laterally-projecting finger-rest on said tubular part, formed with a circular flange or cup, substantially as and for the purpose specified.

3. A hose tip or coupling comprising a tubular part carried at the end of the hose, formed with a reduced part or terminal, and with a shoulder, a finger-rest on said reduced part and resting against said shoulder of the tubular part, and a yielding disk or cushion on the reduced part, substantially as set forth.

4. A hose tip or coupling comprising a tubular part held at the end of the hose, a laterally-projecting finger-rest on the tubular part, having a flange or cup, and a yielding disk or cushion in said cup, substantially as shown and described.

In witness whereof I have hereunto set my hand, this 28th day of February, 1900, in the presence of two subscribing witnesses.

GEORGE W. LISK.

Witnesses:
 MARY T. LISK,
 D. W. PATRIDGE.